United States Patent
Gainford et al.

(10) Patent No.: US 8,262,352 B2
(45) Date of Patent: Sep. 11, 2012

(54) BLADE PITCH CONTROL

(75) Inventors: David Michael Gainford, Birmingham (GB); Jonathan Edmund Holt, Derbyshire (GB); Stephen Granville Garner, Leicestershire (GB)

(73) Assignee: Rolls-Royce PLC, London (GB)

( * ) Notice: Subject to any disclaimer, the term of this patent is extended or adjusted under 35 U.S.C. 154(b) by 481 days.

(21) Appl. No.: 12/555,457

(22) Filed: Sep. 8, 2009

(65) Prior Publication Data

US 2010/0068056 A1 Mar. 18, 2010

(30) Foreign Application Priority Data

Sep. 12, 2008 (GB) .................................. 0816637.3

(51) Int. Cl.
| | |
|---|---|
| B63H 3/06 | (2006.01) |
| B63H 3/00 | (2006.01) |
| B63H 3/10 | (2006.01) |
| B64C 11/30 | (2006.01) |

(52) U.S. Cl. ................. 416/1; 416/35; 416/43; 416/162; 416/168 A; 416/30

(58) Field of Classification Search .................... 416/26, 416/27, 30, 31, 35, 43, 1, 147, 151, 155, 416/162, 168 A
See application file for complete search history.

(56) References Cited

U.S. PATENT DOCUMENTS

| | | | |
|---|---|---|---|
| 3,097,488 A | 7/1963 | Eggenberger et al. | |
| 3,601,617 A | 8/1971 | Mello et al. | |
| 3,636,545 A | 1/1972 | Boyd et al. | |
| 3,639,076 A | 2/1972 | Rowen | |
| 3,911,285 A | 10/1975 | Yannone et al. | |
| 3,924,141 A | 12/1975 | Yannone et al. | |
| 3,943,371 A | 3/1976 | Yannone et al. | |
| 3,943,373 A | 3/1976 | Yannone et al. | |
| 4,010,605 A | 3/1977 | Uram | |
| 4,031,407 A | 6/1977 | Reed | |
| 4,032,793 A | 6/1977 | Uram | |
| 4,118,635 A | 10/1978 | Barrett et al. | |
| 4,166,221 A | 8/1979 | McGaha et al. | |
| 4,195,231 A | 3/1980 | Reed et al. | |
| 4,201,923 A | 5/1980 | Reed et al. | |
| 4,208,591 A | 6/1980 | Yannone et al. | |
| 4,227,093 A | 10/1980 | Uram et al. | |
| 4,246,491 A | 1/1981 | Waldron et al. | |

(Continued)

FOREIGN PATENT DOCUMENTS

EP 1939396 7/2008

(Continued)

*Primary Examiner* — Edward Look
*Assistant Examiner* — William Grigos
(74) *Attorney, Agent, or Firm* — Oliff & Berridge, PLC

(57) ABSTRACT

A method of controlling blade pitch angle, including comparing demanded and measured blade pitch angle and calculating any difference therebetween, in a primary electrical control system, where there is a difference, applying torque to a blade pitch regulator to reduce the magnitude of the difference to zero, and in a secondary electrical control system, where the difference is greater than a pre-determined threshold, applying torque to a blade pitch regulator to reduce the magnitude of the difference to the threshold. Also an electrical system of blade pitch angle control for a set of blades including primary and secondary electrical control systems, means for comparing demanded and measured blade pitch angle and calculating any difference therebetween, a look-up function having the difference as its input and outputting a required torque, and a torque regulator to apply the required torque to the set of blades.

14 Claims, 5 Drawing Sheets

U.S. PATENT DOCUMENTS

| | | | |
|---|---|---|---|
| 4,259,835 A | 4/1981 | Reed et al. | |
| 4,267,458 A | 5/1981 | Uram et al. | |
| 4,283,634 A | 8/1981 | Yannone et al. | |
| 4,308,463 A | 12/1981 | Giras et al. | |
| 4,327,294 A | 4/1982 | Smith et al. | |
| 4,352,024 A | 9/1982 | Geary et al. | |
| 4,380,146 A | 4/1983 | Yannone et al. | |
| 4,426,192 A * | 1/1984 | Chertok et al. | 416/1 |
| 4,445,180 A | 4/1984 | Davis et al. | |
| 4,536,126 A | 8/1985 | Reuther | |
| 4,687,946 A | 8/1987 | Jones | |
| 5,042,246 A | 8/1991 | Moore et al. | |
| 5,042,247 A | 8/1991 | Moore | |
| 5,058,373 A | 10/1991 | Moore | |
| 5,069,030 A | 12/1991 | Moore | |
| 5,099,643 A | 3/1992 | Moore | |
| 5,180,923 A | 1/1993 | Tyler | |
| 5,199,256 A | 4/1993 | Moore | |
| 5,252,860 A | 10/1993 | McCarty et al. | |
| 5,301,499 A | 4/1994 | Kure-Jensen et al. | |
| 5,521,444 A | 5/1996 | Foreman | |
| 5,609,465 A | 3/1997 | Batson et al. | |
| 6,051,951 A | 4/2000 | Arai et al. | |
| 6,070,405 A | 6/2000 | Jerye et al. | |
| 6,379,114 B1 * | 4/2002 | Schott et al. | 416/1 |
| 6,401,446 B1 | 6/2002 | Gibbons | |
| 6,422,816 B1 * | 7/2002 | Danielson | 416/35 |
| 6,801,019 B2 | 10/2004 | Haydock et al. | |
| 6,876,097 B2 | 4/2005 | Thomas et al. | |
| 7,188,008 B2 | 3/2007 | Garnaud et al. | |
| 7,245,040 B2 | 7/2007 | Mukavetz et al. | |
| 7,343,744 B2 | 3/2008 | Abelson et al. | |
| 7,352,076 B1 | 4/2008 | Gabrys | |
| 7,535,684 B2 | 5/2009 | Ganev et al. | |
| 7,643,928 B2 | 1/2010 | Soucy | |
| 8,079,802 B2 | 12/2011 | Takamura et al. | |
| 2007/0013195 A1 | 1/2007 | Mukavetz et al. | |
| 2007/0087892 A1 | 4/2007 | Orlando et al. | |
| 2007/0116572 A1 * | 5/2007 | Barbu et al. | 416/132 B |
| 2011/0106325 A1 | 5/2011 | Opina et al. | |
| 2011/0133453 A1 | 6/2011 | Merswolke et al. | |
| 2011/0320052 A1 | 12/2011 | Yasugi | |

FOREIGN PATENT DOCUMENTS

| | | |
|---|---|---|
| EP | 1990519 | 11/2008 |
| EP | 2163730 A2 | 3/2010 |
| GB | 0667583 | 3/1952 |
| GB | 2175652 | 12/1986 |

* cited by examiner

BLADE PITCH CONTROL

CROSS REFERENCE TO RELATED APPLICATION

This application is entitled to the benefit of British Patent Application No. GB 0816637.3, filed on Sep. 12, 2008.

FIELD OF THE INVENTION

The present invention relates to electrical blade pitch control for rotor blades and is particularly relevant in relation to an engine comprising variable pitch propeller rotor blade stages.

BACKGROUND OF THE INVENTION

A known type of gas turbine engine, particularly for use in aircraft propulsion, is a propeller gas turbine engine or turboprop. This works in conventional form, whereby a core engine comprising compressors, combustion equipment and turbines drives one or more propeller rotor stages via a shaft from a free power, or low-pressure, turbine. The one or more propeller rotor stages may be situated at the front or rear of the engine, where front and rear are defined in terms of the direction of airflow through the engine. The propeller rotor blades extend radially outwardly to describe a larger diameter than the core engine. Each blade is pivotable about its own longitudinal axis to change its pitch and thus its angle of attack relative to the airflow. This variable pitch enables more efficient operation at a variety of operating conditions since the incident angle between the airflow and the blade surface can be optimised for the given airspeed and operating mode of the engine and aircraft.

However, one problem with providing propeller rotor stages with variable pitch blades is that the pitch may be commanded to pivot too far, or may fail with the same effect. Pitch angle is defined as shown in FIG. 1 wherein a blade 8 is shown in plan view. The blade 8 is one of a set of rotor blades rotating clockwise as viewed from the left. Thus blade 8 is travelling down the page. Pitch angle $\phi$ is measured clockwise from top dead centre. The smaller the pitch angle $\phi$, the finer the pitch; a larger pitch angle $\phi$ means a coarser pitch.

When commanded or failing too fine of the desired incident angle the blades present a larger surface area to the airflow and restrict the flow passages between adjacent blades. This means that the blades are driven by the airflow and transmit torque to the core engine, rather than being driven by the core engine, which causes the engine to start overspeeding. If not rapidly controlled, overspeed can cause excessive forces and result in self-destruction of the rotor stage leading to expulsion of high-energy debris. Too fine a blade angle also results in excessive drag, which has a detrimental effect on the performance of the engine and aircraft and may, at extreme angles, cause hazardous or catastrophic loss of control of the aircraft.

Conversely, if the pitch of the blades is commanded to or fails at too coarse an angle the blades begin to feather. At the extreme the blades are edge-on to the airflow and present little or no drag. However, they also exhibit a large resistance to rotation.

There are benefits to providing two stages of propeller rotor blades that rotate in opposite directions and are connected by a differential gearbox. This contra-rotation ensures that airflow leaving the stages is substantially parallel to that entering the stages. However, this may mean that if the forward propeller rotor blades are commanded or fail towards fine pitch little or no airflow can reach the rear propeller stage and little torque would be transmitted to the rear propeller stage. Similarly, if the forward propeller rotor blades are commanded or fail towards coarse pitch, there is excess torque transmitted through the differential gearbox to the rear propeller stage.

During operation of the engine during normal flight modes it is necessary to prevent propeller rotor blades being driven either too fine or too coarse. Conventionally rotor blade control is provided by mechanical or hydraulic systems. However, these systems are generally complex, particularly when used in a contra-rotating engine where communication to the rear propeller stage is especially challenging. Hydraulic systems, particularly, require back up fluid power for some failure cases. These factors lead to relatively high maintenance and inspection costs.

SUMMARY OF THE INVENTION

The present invention seeks to provide rotor blade pitch angle control that seeks to address the aforementioned problems.

Accordingly, the present invention provides a method of controlling blade pitch angle using a primary and a secondary electrical control system, the method includes the steps of:
  a. comparing a demanded and a measured blade pitch angle and calculating any difference therebetween,
  b. in the primary electrical control system, where there is a difference, applying a torque to a blade pitch regulator to reduce the magnitude of the difference to zero, and
  c. in the secondary electrical control system, where the difference is greater than a pre-determined threshold, applying a torque to a blade pitch regulator to reduce the magnitude of the difference to the pre-determined threshold.

The method is beneficial because it enables blade pitch to be controlled using primary and secondary systems. These can provide back-up functionality and may also provide additive control when the demanded and measured blade pitch angles greatly differ to more quickly bring the measured angle towards that demanded.

The comparison step may be performed independently for each of the primary and secondary electrical control systems. This offers redundancy in the method.

The difference may be defined as positive when the measured blade pitch angle is more coarse than the demanded pitch angle. The torque may be applied to change the blade to be finer than its measured blade pitch angle.

The torque applied may be proportional to the difference so that large or small differences can be corrected quickly.

Above the threshold both the primary and secondary electrical control systems may apply torque to the blade pitch regulator. Advantageously, differences above the threshold are controlled more quickly to below the threshold.

In the event of a failure of at least one of the primary and secondary electrical control systems, the method may further comprise the step of applying a failsafe torque control to the blade pitch angle to achieve a failsafe condition. Advantageously this minimises the risks associated with such a failure case.

In a second aspect of the present invention there is provided an electrical system of blade pitch control for a set of blades, the system having:
  a. a primary electrical control system comprising a primary look-up function,
  b. a secondary electrical control system comprising a secondary look-up function, c. means for comparing a demanded and a measured blade pitch angle and calculating any difference therebetween, the means coupled to the primary and secondary electrical control systems, d. the primary look-up function having the difference as its input and outputting a required torque, e. the secondary look-up function having the difference as its input and outputting a required torque, the output being zero below an input threshold, and f. a torque regulator coupled to the primary and secondary electrical control systems to apply the required torque to the set of blades.

The system provides apparatus to control the pitch of the set of blades and advantageously provides back-up functionality by having two electrical control systems. Alternatively the two control systems can work in concert to effect a more rapid control of blade pitch.

Each of the primary and secondary electrical control systems may comprise means for calculating any difference, a look-up function and a torque regulator. This has the benefit of providing redundancy in the system.

The required torque may be proportional to the difference so that large or small differences can be corrected quickly.

The secondary look-up function outputs zero below an input threshold. Thus the primary electrical control system has sole control up to the threshold difference.

The system may further include trip logic that triggers when at least one of the primary and secondary electrical control systems fails. Alternatively, when one of the systems fails the trip logic may trigger that electrical control system to trip or may trigger both control systems to trip. These options provide a range between preventing unnecessary tripping and reacting rapidly to failure.

The trip logic may trigger a mechanical response, such as that described in the next paragraph. Beneficially the trip response may work even if an electrical fault is present.

In a third aspect of the present invention there is a failsafe blade feather apparatus including a blade pitch angle regulator and an adjacent structure, the adjacent structure having at least one magnet connected thereto; the blade feather arrangement further having at least one plunger apparatus, the plunger apparatus connected to the blade pitch angle regulator and including a magnet, the plunger apparatus having retracted and deployed configurations wherein the retracted configuration is such that the magnet is spaced from the adjacent structure by sufficient distance to minimise the magnetic force therebetween, and the deployed configuration is such that the magnet is close enough to the adjacent structure to create a magnetic force therebetween; the plunger apparatus further including electrical retraction mechanism such that when current is applied, the plunger is held in the retracted configuration and when current is interrupted, the plunger is released into the deployed configuration. Advantageously, this apparatus is equally effective to slew the blades to feather when an electrical fault occurs as when a trip signal is sent to interrupt the current to the apparatus.

DETAILED DESCRIPTION OF THE PREFERRED EMBODIMENTS

Figure 1:
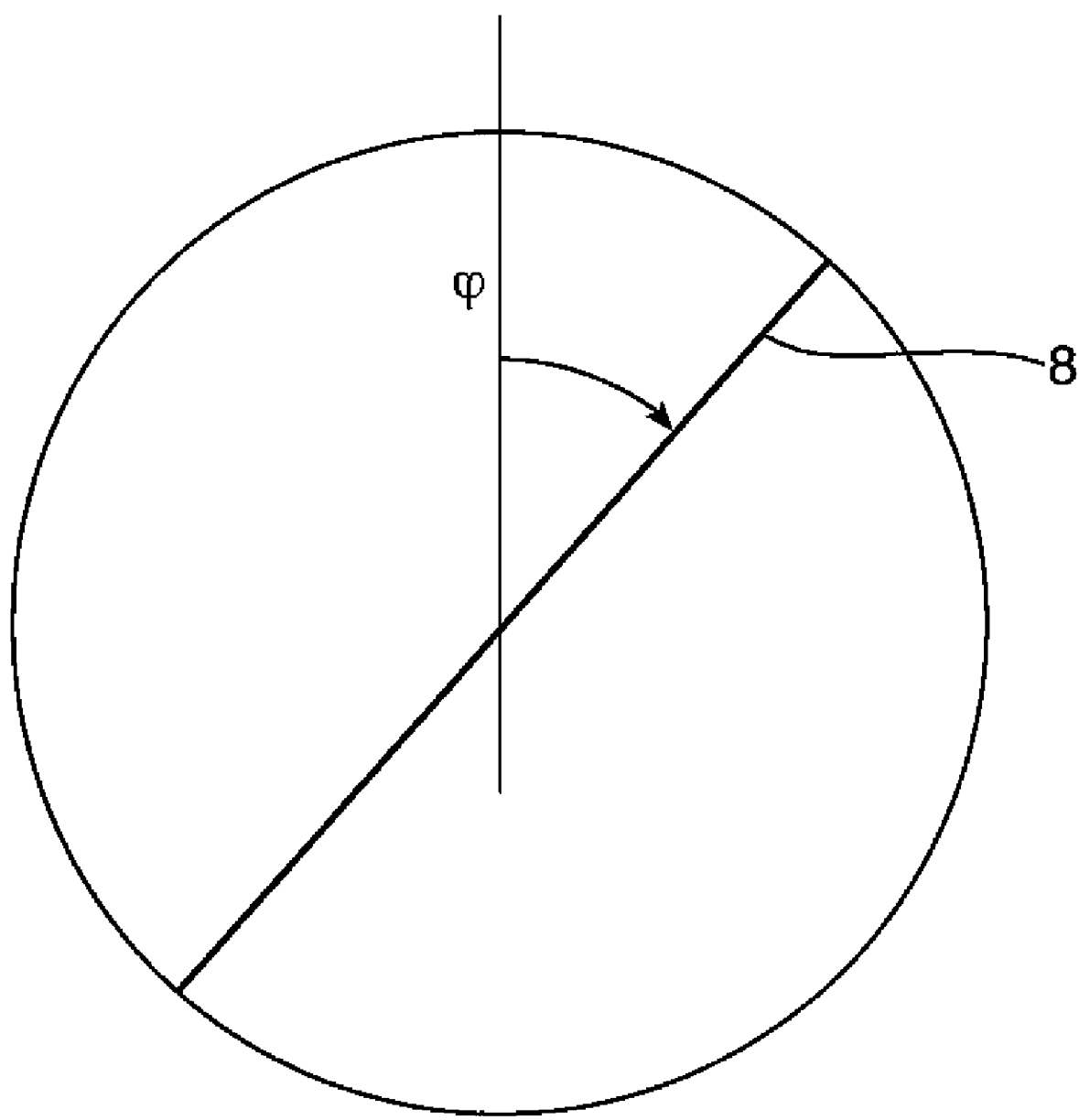
FIG. 1 is a schematic plan view of a blade showing pitch angle.
Figure 2:
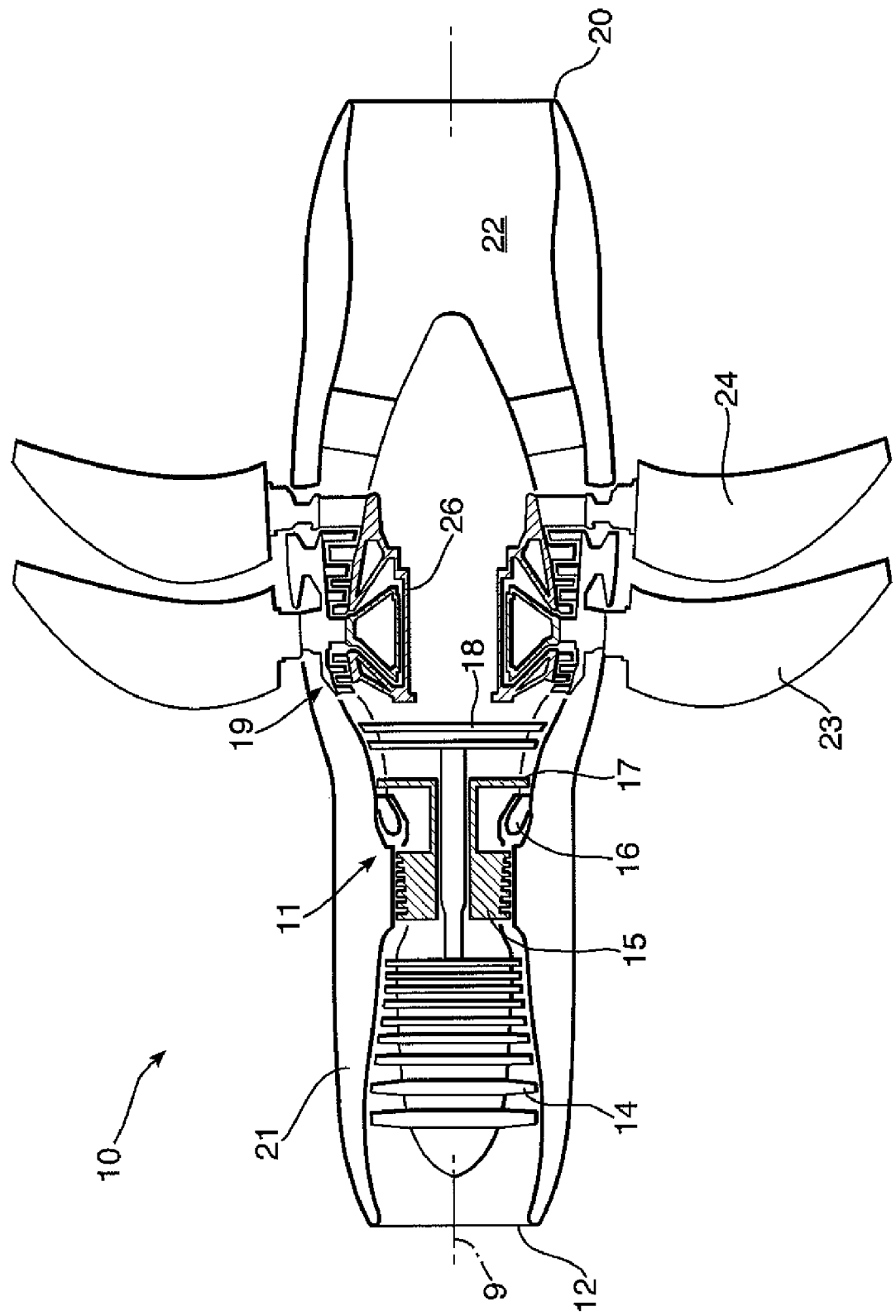
FIG. 2 is a sectional side view of a gas turbine engine having contra-rotating propeller stages.

Referring to FIG. 2, a twin-spooled, contra-rotating propeller gas turbine engine is generally indicated at 10 and has a principal rotational axis 9. The engine 10 has a core engine 11 having, in axial flow series, an air intake 12, an intermediate pressure compressor 14, a high-pressure compressor 15, combustion equipment 16, a high-pressure turbine 17, intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also includes two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9. This contra-rotation is achieved by use of an epicyclic and differential gear box connecting the propellers 23, 24 or any suitable alternative.

Figure 3:
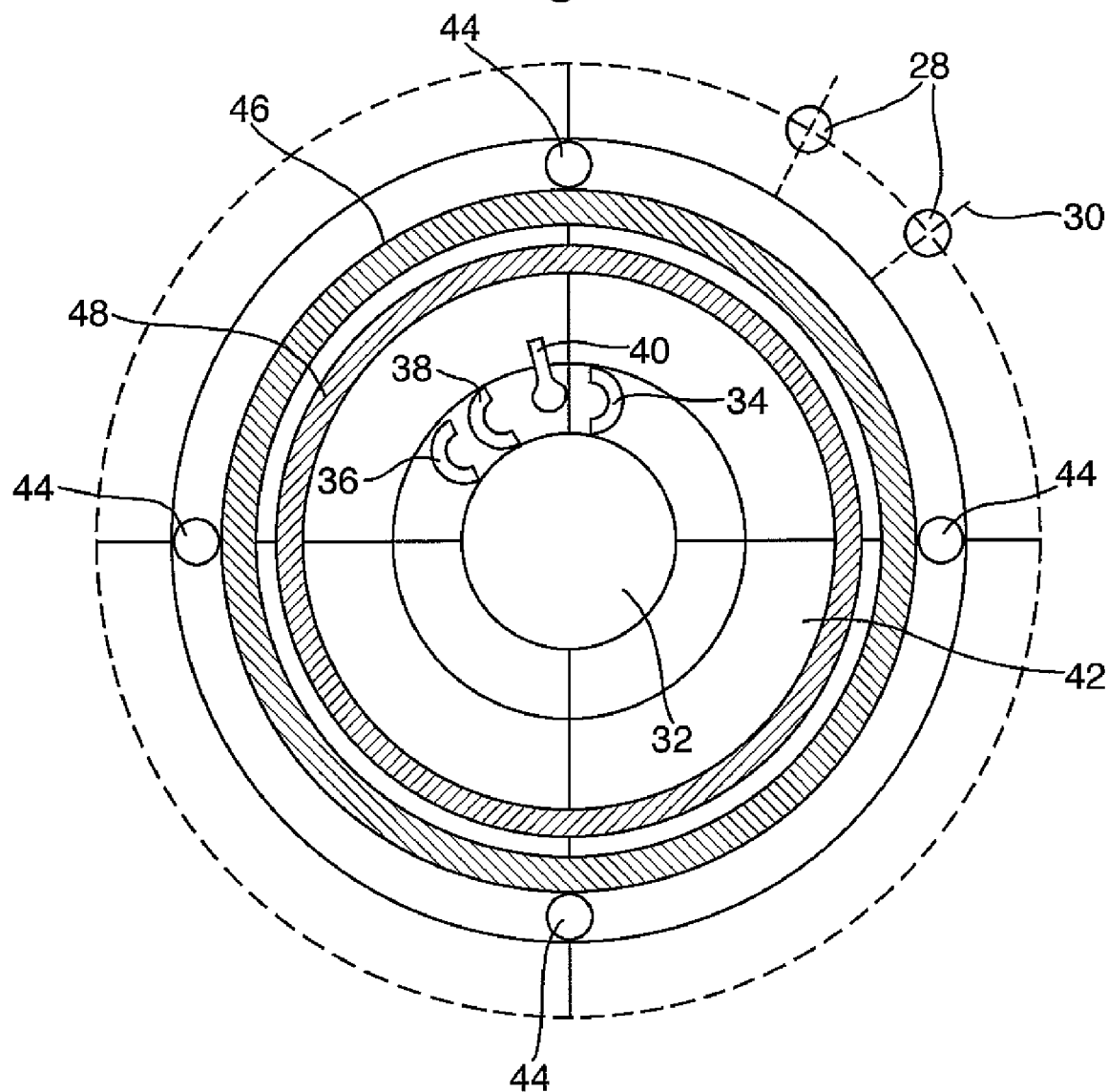
FIG. 3 is a schematic front view of a platform of a propeller stage of the contra-rotating gas turbine engine of FIG. 2 incorporating the electrical blade pitch change apparatus of the present invention.

It is known to provide electrical generation means using the relative rotation between two rotating components, or one rotating and one stationary component, see for example GB 603,450. The precise form of the electrical generation means does not affect the present invention. In a gas turbine engine, particularly an engine for an aircraft, the electrical generation means is provided for loads such as anti-icing heat generation. Typically electrical generation mechanism is provided for each propeller stage 23, 24 to enable independent switching in of the anti-icing on each propeller stage 23, 24, but in other applications the electrical generation mechanism provided for only one of the propeller stages 23, 24 may be sufficient.

Where electrical generation is in use on a turboprop engine it is convenient to utilise electrical blade pitch angle control. Thus each blade of the propeller rotor stage 23, 24 is mounted on a blade spindle 28, two of these being shown in FIG. 3. The axis of rotation 30 of the blade about its spindle 28 is radially outwardly from the centre of the hub 32. The spindles 28 are arranged to be actuated by a platform 42 such that rotation of the platform 42 in a first direction about its centre causes the blade spindles 28 to synchronously rotate about their own axes 30 in a first direction and rotation of the platform 42 in the opposite sense causes the blade spindles 28 to rotate in the opposite sense around their own axes 30.

Hub 32 is fixed to and surrounds the shaft 26 to rotate in synchronicity with the shaft 26 and blades. Platform 42 is free to rotate faster or slower relative to the hub 32 to effect blade pitch angle changes. Connected to or integral with the hub 32 are a series of stops 34, 36, 38 that interact with an engagement peg 40 that rotates with the platform 42. There is a coarse stop 34 that engages the engagement peg 40 to prevent the blades being rotated to a coarser angle than the safe design angle. Similarly, a fine stop 36 is provided facing in the opposite circumferential direction to stop rotation at the maximum safe fine pitch angle. Circumferentially towards the engagement peg 40 of the fine stop 36 is a retractable flight fine stop 38. This limits the relative platform 42 rotation during flight to a smaller maximum fine angle in order to prevent excessive drag in flight since the failure cases are more severe during aircraft flight than during landing or on-ground manoeuvres. As is well known in the art, suitable safeguards are applied to prevent inadvertent retraction of the flight fine stop 38 during flight conditions.

Equally spaced around the outer edge of the platform are four failsafe blade feather apparatus 44 that will be described in more detail below with respect to FIG. 5. In normal use, when electrical power is available via the electrical generation means (not shown), these feather apparatus 44 have no effect. In the event of a loss of electrical power, and the consequent loss of blade pitch angle control, they act to drive the blades to feather, which is considered a relatively safe failure mode.

Mounted on the platform 42 and provided radially inwardly of the feather arrangements 44 are two torque coils 46, 48 that act, when energised, to apply torque to the platform 42 to rotate it relative to the hub, either clockwise or anticlockwise as illustrated, to actuate the blade spindles 28. Each torque coil 46, 48 applies torque in either circumferential direction. Thus the primary torque coil 46, when energised, can apply torque in the anticlockwise direction to cause the blade spindles 28 to rotate the blades to a finer angle or in the clockwise direction to cause the blade spindles 28 to rotate the blades to a coarser angle. Similarly, the secondary torque coil 48, when energised, can apply torque in one direction to cause the blade spindles 28 to rotate the blades to a coarser angle and in the other direction to cause the blade spindles 28 to rotate the blades to a finer angle. This enables addition of the torque provided by, for example, the secondary torque coil 48 to that provided by the primary torque coil 46 to rotate the blade spindles 28 further and/or quicker. This is particularly advantageous in fault aversion scenarios, for example where the blades are beginning to overspeed, as it allows the fault to be controlled more quickly.

Figure 4:
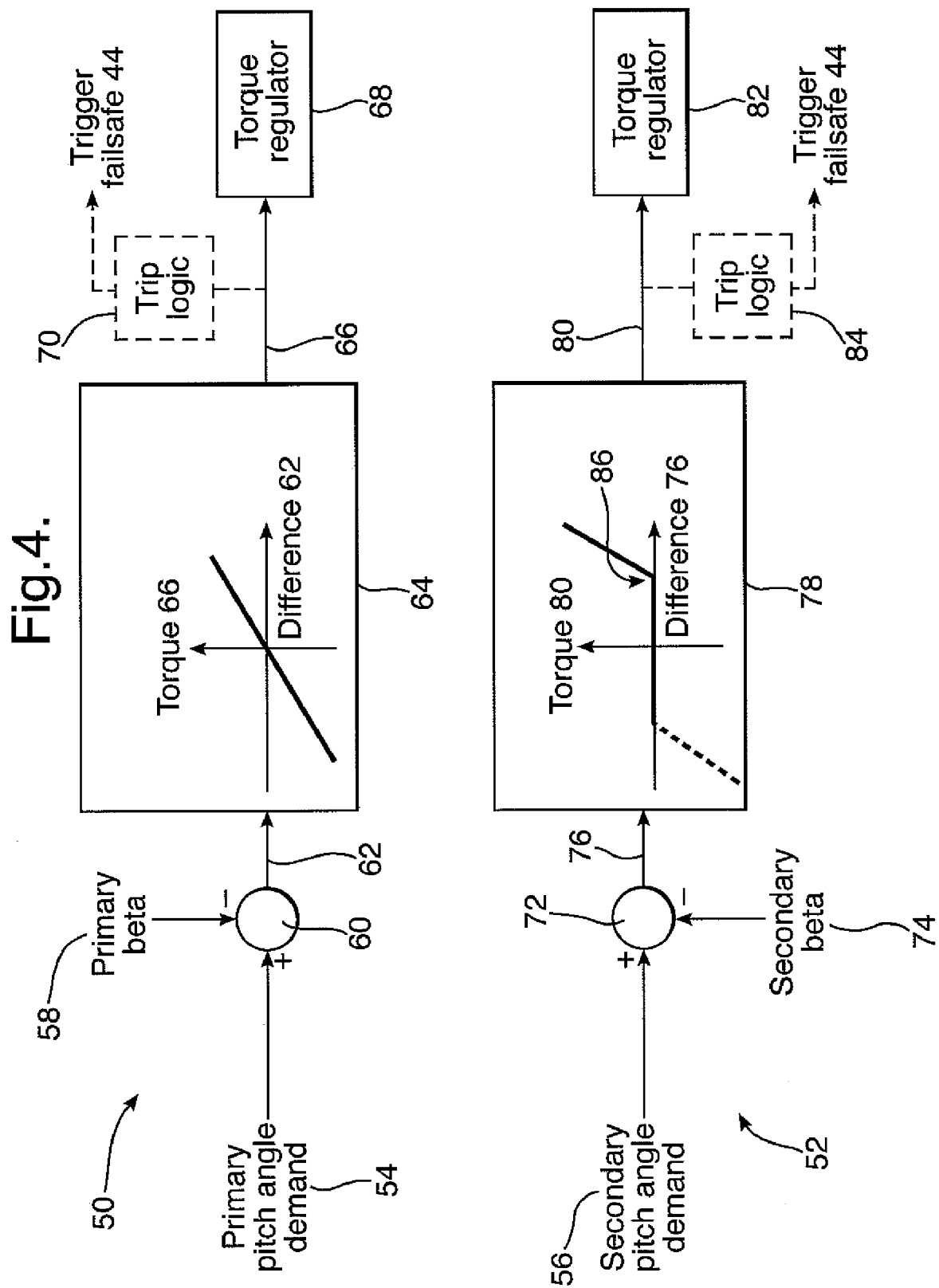
FIG. 4 is a flow chart of the control logic of the method of the present invention.

The control logic will now be described with reference to FIG. 4. The control may be implemented using any suitable hardware (not shown) and this may be either collocated with the platform 42 or located remotely, for example with the main engine electronic control systems. The preferred embodiment of the control logic of the present invention is shown in FIG. 4 and comprises two logic paths 50, 52, one for each of the primary and secondary electrical control systems, that are substantially identical. In the primary path 50 the demanded pitch angle 54 is read in from the main engine control systems. Similarly, in the secondary path 52 the demanded pitch angle 56 is read in. The demanded pitch angles 54, 56 may be provided from the same signal. To provide increased redundancy within the system they may, alternatively, be provided from separate sources, for example two channels of the main engine control system or be calculated from two separate sets of measured parameters.

The current blade angle around the spindle 28, usually referred to as primary "beta" 58, is measured and provided to the primary path 50. In a summer 60 the difference 62 is calculated between the demanded blade pitch angle 54 and the measured primary beta 58. This difference 62 is passed to a look-up function 64, which outputs the required torque 66. The illustrated two-way graph comprises the difference 62 on the x-axis and the required torque 66 on the y-axis. However, the look-up function 64 can take various alternative forms including a reference table, a function or formula, or another method of outputting the required torque 66 given the difference 62 as the input. In the illustrated embodiment there is a linear relationship between the input difference 62 and output required torque 66. In some applications of the method of the present invention it may be desirable to have a different relationship. For example, it may be advantageous to have a steeper gradient at greater differences 62 (e.g. a quadratic relationship) such that a small increase in difference 62 results in a large increase in required torque 66 since at large differences 62 the risks to the engine 10 and aircraft are greater. The required torque 66 is then provided to a torque regulator 68. This regulator 68 commands the primary torque coil 46 to energise to the appropriate torque level.

Optionally there is additional trip logic 70 provided that also receives the required torque 66 output from the look-up function 64. The trip logic 70 acts to trigger the failsafe feather arrangement 44 by interrupting the current supply thereto. This may be achieved by any suitable means, such as a normally closed switch that opens without current supply or a bistable switch that operates in a first, closed state when receiving current and in a second, open state when lacking current. Alternatively the trip logic 70 may receive the difference 62 as its triggering input.

The secondary logic path 52 is substantially similar to the primary path 50. The demanded blade pitch angle 56 is provided to a summer 72, which also receives the measured secondary beta 74. Preferably this is measured independently of the primary beta 58 to provide sufficient redundancy in the system. Alternatively, however, it may be provided from the same source. The summer 72 calculates the difference 76 between the demanded blade pitch angle 56 and the secondary beta 74. The difference 76 is provided as the input to a look-up function 78. The output therefrom is the required torque 80. This is provided to a torque regulator 82 that commands the secondary torque coil 48 to energise to the appropriate torque level. Optionally there is trip logic 84 that receives the required torque 80 output from the look-up function 78 and acts to trigger the failsafe feather arrangement 44 as described with respect to the primary trip logic 70. Alternatively it receives the difference 76 as its triggering input.

The secondary look-up function 78 advantageously defines a more complicated relationship between the input difference 76 and output required torque 80. As illustrated, the required torque 80 is set at zero for differences 76 up to a given threshold 86 in the positive sense. For differences 76 greater than this threshold 86 there is a linear relationship, with a steeper gradient than that provided in the primary look-up function 64. Alternatively a non-linear relationship may be used. Since the primary and secondary logic paths 50, 52 are summed, this means that up to the threshold 86 the output required torque 66 is equal only to the primary look-up function 64 output but for differences 62, 76 greater than the threshold 86 both the look-up functions 64, 78 output required torque levels 66, 80. The addition of the steeper gradient in the secondary look-up function 78 offers a quicker correction for large differences between the demanded and measured blade angles, thereby reducing the risks to both the engine 10 and the aircraft. Alternatively the torque gain could be higher in a downstream part of the system.

Optionally there may be an equivalent threshold and linear, or non-linear, relationship for negative differences 76 in the secondary look-up function 78, shown by a dashed line in FIG. 4. This means that when the blades have been driven to feather, for example due to a fault, some control is retained to reduce the blade pitch angle from its maximum and offer some "get home" use instead of the blades freewheeling. However, the provision of this optional relationship must always be balanced against the requirement for a bias towards feather (maximum coarse blade pitch angle) for safety.

There may be error calculation and reporting logic (not shown) provided on either, preferably both, logic paths 50, 52 that triggers the trip logic 70, 84 if a significant discrepancy is found in the primary or secondary logic paths 50, 52. Thus, if the primary torque regulator 68 acts in the opposite sense to that commanded the error logic could signal to the primary trip logic 70 so that the blades are not driven to too fine an angle and similarly for other fault conditions. The error logic could also invoke the trip logic 70, 84 if the difference 62, 76 were greater than a predetermined limit.

The trip logic 70, 84 may interact in a variety of ways. The primary trip logic 70 may have greater authority than the secondary trip logic 84 so that only a loss of current to the primary torque coil 46 or an error in the primary logic path 50 is required to activate the failsafe feather arrangement 44. Alternatively the secondary trip logic 84 could have greater authority as it already has a backup role, only applying a torque if the primary logic path 50 cannot control the blade pitch angle sufficiently. In a further alternative, both the primary and secondary trip logic 70, 84 must agree to trip in order to activate the failsafe feather arrangement 44. This reduces the chance of a rogue reading in one logic path 50, 52 tripping the system when there is a good reading in the other path 50, 52 but may make the trip logic 70, 84, and therefore the failsafe feather arrangement 44, slower to react.

Figure 5:
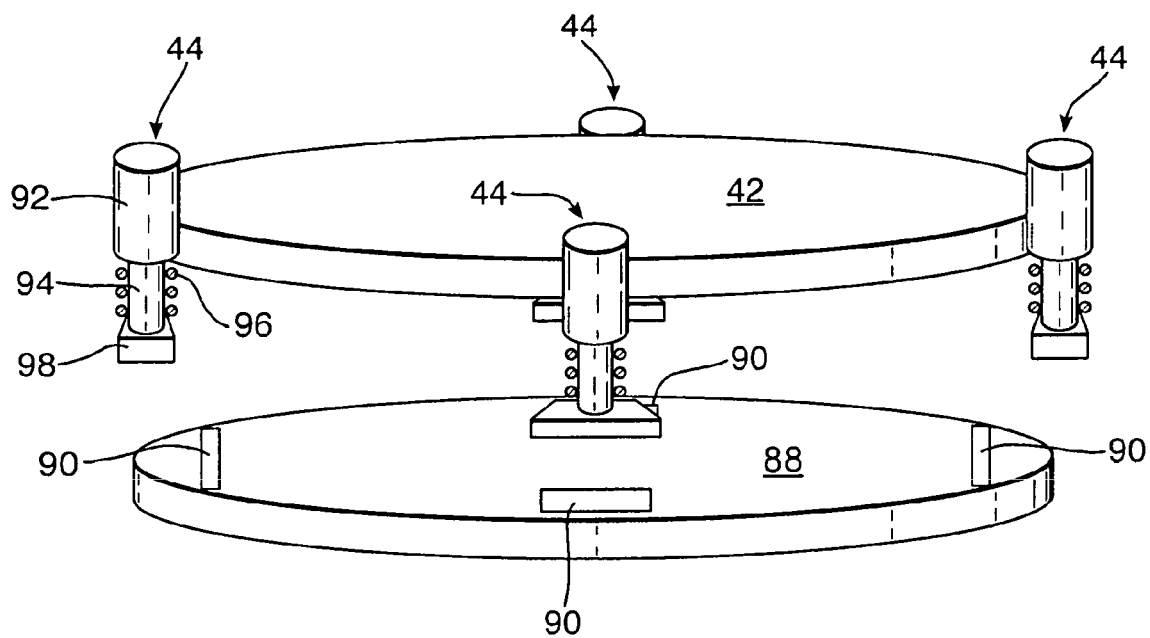
FIG. 5 is a schematic perspective view of the failsafe blade feather apparatus according to a second aspect of the present invention.

Referring to FIG. 5, the failsafe feather apparatus 44 will be described in more detail. The platform 42 is shown with many of the features omitted for clarity. Four failsafe feather apparatus 44 are shown equally spaced around the circumference of the platform 42. Most preferably the apparatus 44 are identical so that all the arrangements act in concert. A second platform 88 is arranged parallel to the main platform 42. The second platform 88 may be associated with a second of the propeller stages 23, 24 and have a similar arrangement to the main platform 42. Alternatively, it may be a fixed structure or another rotating part of the engine 10. Thus the second platform 88 is an adjacent structure to the platform 42. Mounted on the second platform 88 or integral therewith are four magnets or magnetic portions 90.

Each failsafe feather apparatus 44 has a main body 92 that houses electrical retraction mechanism. The main body 92 is connected to or mounted on the platform 42. A piston 94 extends from the main body 92 towards the second platform 88. At the opposite end of the piston 94 to the main body 92 is a magnet 98. This may take the form of a bar magnet, or another shape as appropriate. Preferably the magnet 98 is a permanent magnet so that there is no failure mode where the magnet 98 is not magnetic. However, alternatively it may have a ferromagnetic material, so that it is only magnetic below its Curie temperature, or may be an electromagnet.

A compression spring 96 surrounds the piston 94 and acts to push the magnet 98 away from the main body 92 and towards the second platform 88 in the absence of a retaining/retracting force. The magnet 98 is aligned with one of the magnets or magnetic portions 90 of the second platform 88 so that a magnetic holding force is generated therebetween. This holding force acts to arrest rotary motion of the platform 42 and, therefore, the blade spindles 28. The magnets or magnetic portions 90 are so positioned that the magnetic holding force is strongest when the blade spindles 28 have rotated the blades to their maximum coarse (feather) angle. Therefore, the blades are retained at feather by the magnetic holding force.

The electrical retraction mechanism housed within the main body 92 of the feather apparatus 44 provides a retaining force acting against the compression spring 96 when a current is supplied thereto. This means the magnet 98 is retained close to the main body 92 and is thus spaced from the magnet or magnetic portion 90 by sufficient distance that the magnetic holding force is negligible. Since the magnetic force is inversely proportional to the distance, a relatively small spacing is required to reduce the magnetic holding force sufficiently. In the absence of electrical current, the electrical retraction means applies no retaining force and the compression spring 96 acts to push the magnet 98 towards the second platform 88. When current is restored to the electrical retraction means, the retaining force is reasserted. This force is sufficiently large to overcome the magnetic holding force and return the magnet 98 to its non-deployed position spaced apart from the second platform 88.

Use of electrical retraction mechanism for the failsafe apparatus 44 is advantageous since, in the event of an electrical fault, the current is immediately unavailable and the arrangement 44 slews the blades towards feather. The apparatus 44 may be refined by the addition of a current range within which to trigger. This would have the effect of enabling the apparatus 44 to slew the blades to the safe feather angle when electrical current dropped, without being reduced to zero. A second, high range could enable the apparatus 44 to slew the blades in the event of a current surge as well. It may be necessary to apply damping to the apparatus 44 response so that electrical current fluctuations do not unnecessarily deploy the magnet 98.

Although a compression spring 96 has been described, other biasing means may be substituted with equal felicity.

Although the present invention has been described having four failsafe feather arrangements 44, it may equally be put into effect with more or fewer than four arrangements 44. It may be necessary to change the strength and/or size of the magnets used in this case, but this is simply determined by the application of non-inventive detailed engineering design.

Additional features can be added to the arrangement of the present invention such as the provision of friction clutches or hydraulic drag mechanisms.

What is claimed is:

1. A method of controlling blade pitch angle using a primary and a secondary electrical control system, the method comprising the steps of:
   a. Comparing a demanded and a measured blade pitch angle and calculating any difference therebetween,
   b. in the primary electrical control system, where there is a difference, applying a torque to a blade pitch regulator to reduce the magnitude of the difference to zero, and
   c. in the secondary electrical control system, where the difference is greater than a pre-determined threshold, applying a further torque to a blade pitch regulator to reduce the magnitude of the difference to the pre-determined threshold.

2. A method as claimed in claim 1 wherein step 1a is performed independently for each of the primary and secondary electrical control systems.

3. A method as claimed in claim 1 wherein the difference is positive when the measured blade pitch angle is more coarse than the demanded blade pitch angle.

4. A method as claimed in claim 3 wherein the torque and the further torque are applied to change the blade pitch angle to be finer than its measured blade pitch angle.

5. A method as claimed in claim 1 wherein the torque and the further torque applied are proportional to the difference.

6. A method as claimed in claim 1 wherein above the threshold both the primary and secondary electrical control systems apply torque to the blade pitch regulator.

7. A method as claimed in claim 1 wherein, in the event of a failure of at least one of the primary and secondary electrical control systems, the method further comprises the step of applying a failsafe torque control to the blade pitch angle to achieve a failsafe condition.

8. An electrical system of blade pitch angle control for a set of blades, the system comprising:
   a. a primary electrical control system comprising a primary look-up function,
   b. a secondary electrical control system comprising a secondary look-up function,
   c. means for comparing a demanded and a measured blade pitch angle and calculating any difference therebetween, the means coupled to the primary and secondary electrical control systems,
   d. the primary look-up function having the difference as its input and outputting a required torque,
   e. the secondary look-up function having the difference as its input and outputting a further required torque, the output being zero below an input threshold, and
   f. a torque regulator coupled to the primary and secondary electrical control systems to apply the required torque and the further required torque to the set of blades.

9. A system as claimed in claim 8 wherein each of the primary and secondary electrical control systems comprises means for calculating the any difference and a torque regulator.

10. A system as claimed in claim 8 wherein the required torque and the further required torque is proportional to the difference.

11. A system as claimed in claim 8 wherein the system further comprises trip logic that triggers when at least one of the primary and secondary electrical control systems fails.

12. A system as claimed in claim 11 wherein, when one of the primary and secondary electrical control systems fails, the trip logic triggers that electrical control system to trip.

13. A system as claimed in claim 11 wherein, when one of the primary and secondary electrical control systems fails, the trip logic triggers both electrical control systems to trip.

14. A system as claimed in claim 11 wherein the trip logic triggers a mechanical response.

\* \* \* \* \*